United States Patent
Wong et al.

(10) Patent No.: US 9,042,810 B2
(45) Date of Patent: May 26, 2015

(54) SINGLE-CABLE AUTOMATIC IRD INSTALLATION PROCEDURE

(71) Applicant: Entropic Communications, Inc., San Diego, CA (US)

(72) Inventors: Peter Wong, San Diego, CA (US); Troy Brandon, San Diego, CA (US); Jon Huss, El Cajon, CA (US)

(73) Assignee: Entropic Communications, Inc., San Diego, CA (US)

( * ) Notice: Subject to any disclaimer, the term of this patent is extended or adjusted under 35 U.S.C. 154(b) by 0 days.

(21) Appl. No.: 14/135,561

(22) Filed: Dec. 19, 2013

(65) Prior Publication Data

US 2014/0123194 A1   May 1, 2014

Related U.S. Application Data

(62) Division of application No. 13/112,429, filed on May 20, 2011, now Pat. No. 8,639,179.

(60) Provisional application No. 61/476,257, filed on Apr. 16, 2011.

(51) Int. Cl.

| H04H 20/74 | (2008.01) |
|---|---|
| H04N 21/426 | (2011.01) |
| H04H 20/63 | (2008.01) |
| H04N 21/61 | (2011.01) |
| H04N 21/6334 | (2011.01) |

(Continued)

(52) U.S. Cl.
CPC .............. *H04N 21/426* (2013.01); *H04H 20/63* (2013.01); *H04N 21/6193* (2013.01); *H04N 21/6334* (2013.01); *H04N 21/6547* (2013.01); *H04H 40/90* (2013.01)

(58) Field of Classification Search
CPC ....... H04H 20/63; H04H 20/00; H04H 20/10; H04H 20/08; H04H 40/90; H04H 40/00; H04H 40/09; H04H 40/18; H04N 21/426; H04N 21/41; H04N 21/4104; H04N 21/6193; H04N 21/63; H04N 21/633; H04N 21/637
USPC ......... 455/153.2, 3.02, 337, 3.06, 420, 456.2, 455/12.1, 464, 509, 83, 556.1, 168.1, 188.1, 455/267, 423, 115.3, 115.4, 157.2; 725/67, 725/68, 110, 70, 14, 114, 78, 46, 63; 342/359; 343/703, 894
See application file for complete search history.

(56) References Cited

U.S. PATENT DOCUMENTS

| 7,504,941 B1 | 3/2009 | Taskin et al. |
|---|---|---|
| 7,945,932 B2 | 5/2011 | James et al. |
| 8,451,171 B1 * | 5/2013 | Santoru .......................... 342/359 |

(Continued)

*Primary Examiner* — Tan Trinh
(74) *Attorney, Agent, or Firm* — Richard Bachand

(57) ABSTRACT

A method, apparatus, system, and computer program product for auto-installing an integrated receiver/decoder (IRD) includes issuing an auto-installation command from the IRD to an outdoor unit (ODU) and receiving a plurality of tones from the ODU in response to the auto-installation command, each tone representing a center frequency of available user bands (UBs). The auto-installation also includes acquiring a UB center frequency by the IRD, requesting the ODU to confirm a UB number corresponding to the acquired UB center frequency, and receiving confirmation from the ODU that a UB number corresponds to the acquired UB center frequency. The auto-installation also includes sending an acceptance of the assigned UB number from the IRD to signal the ODU that it may mark the assigned UB as assigned.

22 Claims, 6 Drawing Sheets

(51) Int. Cl.
*H04N 21/6547* (2011.01)
*H04H 40/90* (2008.01)

(56) References Cited

U.S. PATENT DOCUMENTS

| | | |
|---|---|---|
| 2006/0225098 A1 | 10/2006 | James et al. |
| 2006/0225099 A1 | 10/2006 | James et al. |
| 2006/0225100 A1* | 10/2006 | James et al. ............ 725/63 |
| 2006/0225101 A1 | 10/2006 | James et al. |
| 2006/0225102 A1 | 10/2006 | James et al. |
| 2006/0225103 A1 | 10/2006 | James et al. |
| 2006/0225104 A1 | 10/2006 | James et al. |
| 2008/0120653 A1* | 5/2008 | Stroes et al. ............ 725/70 |
| 2008/0209478 A1* | 8/2008 | Santoru et al. ............ 725/68 |
| 2008/0216141 A1* | 9/2008 | Long et al. ............ 725/114 |
| 2008/0222683 A1* | 9/2008 | Deleu ............ 725/78 |
| 2009/0036086 A1* | 2/2009 | Chen et al. ............ 455/307 |
| 2010/0313232 A1* | 12/2010 | Norin ............ 725/110 |
| 2011/0016496 A1* | 1/2011 | Popa et al. ............ 725/68 |
| 2011/0307916 A1 | 12/2011 | James et al. |
| 2013/0288593 A1* | 10/2013 | Norin et al. ............ 455/12.1 |

* cited by examiner

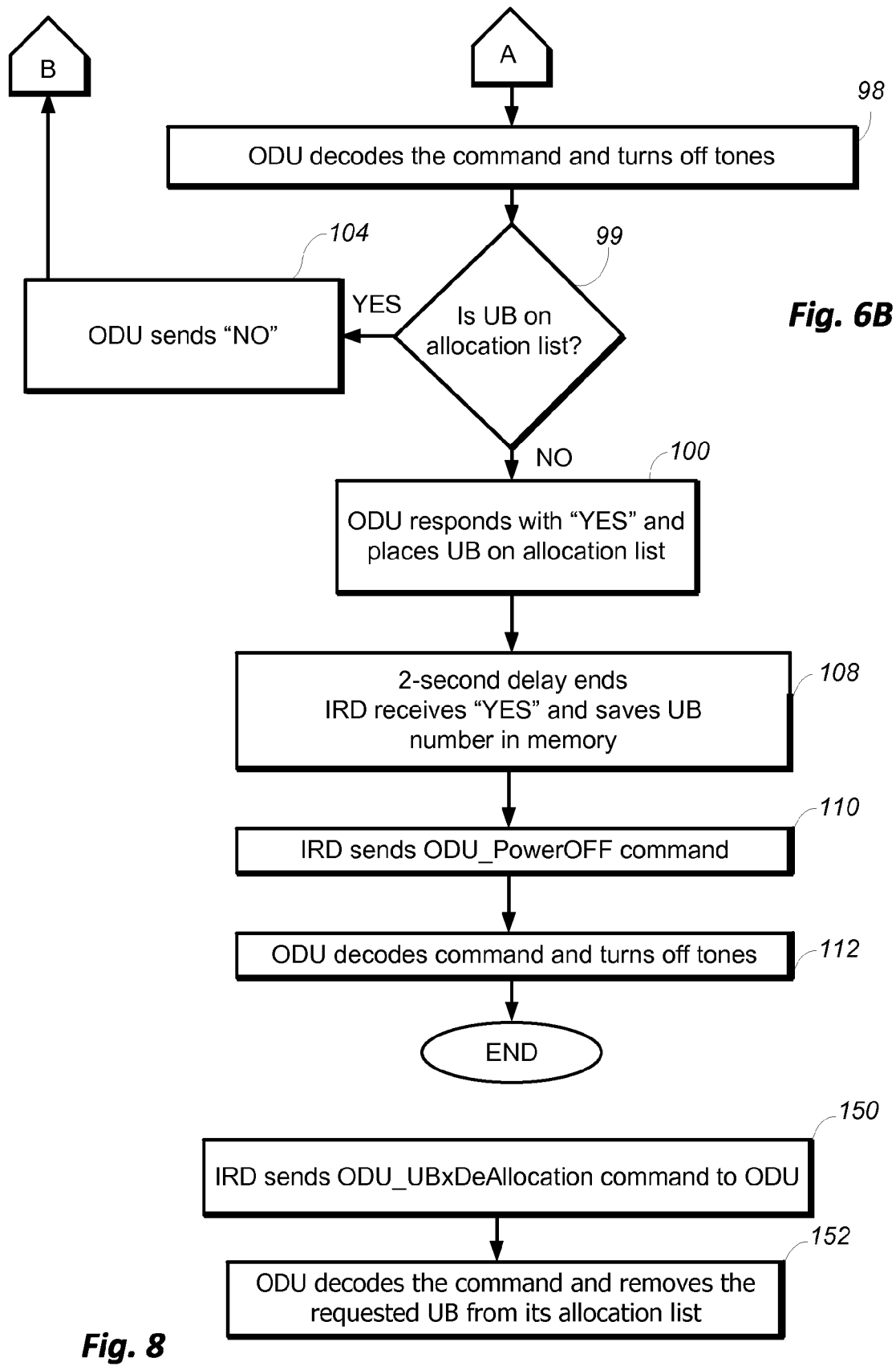

SINGLE-CABLE AUTOMATIC IRD INSTALLATION PROCEDURE

CROSS REFERENCE TO RELATED APPLICATION

This application is a divisional of copending U.S. application Ser. No. 13/112,429, filed May 20, 2011, which claims the benefit of U.S. Provisional Application No. 61/476,257, filed Apr. 16, 2011.

TECHNICAL FIELD

The disclosed methods, apparatuses, systems, and computer program products relate to satellite television signal receiving technology, and more particularly, to methods, apparatuses, systems, and computer program products for the auto-installation of IRDs in single-cable satellite television signal distribution systems.

BACKGROUND

The single-cable distribution technologies described herein relate generally to television signal delivery techniques. These techniques enable satellite broadcast programming to be distributed to multiple users over a single plastic optical fiber (POF), coaxial cable, or the like. These single-cable techniques also eliminate the numerous cables that would otherwise be required to support multiple consumer electronic devices, referred to herein as integrated receiver/decoders (IRDs). IRDs convert radio-frequency signals to a form that can be used in content displays, or the like. IRDs include, for example, television tuner-receivers, single or twin tuner digital video recorders (DVRs), television receivers, single or multiple set-top boxes (STBs), servers that distributes video signals to client boxes that feed display devices, or the like. The term IRD is intended to refer to any such device, regardless of any additional capabilities that it may have, such as recording television content, delaying the display of broadcasts, enabling WiFi communications, or the like. The term applies regardless of the location of the device, such as on top of, below, or beside a television set or other display device, embedded within the television set or other display device, or the like.

Single-cable distribution technology is finding widespread use in satellite television signal delivery. Without single-cable distribution, providing full spectrum access for multiple receivers or receivers with multiple tuners in a single family home has required separate cables feeding respective IRDs from satellite antenna equipment. Such satellite equipment is commonly referred to as an outdoor unit (ODU).

Typical ODUs include: (1) a parabolic dish or reflector; and (2) a low-noise block (LNB) mounted on the feed of the dish. The LNB may include an RF front-end, a multi-switch, and/or other signal processing and distribution equipment. Alternatively, the multi-switch and at least some of signal processing and distribution equipment may reside in a module that is distinct remote the LNB. The parabolic dish directs satellite microwave signals on which multiple television signals are encoded into the RF front end. These signals are encoded with multiple television signals over a very wide bandwidth. It should be noted that the term "ODU" is denotes outdoor satellite antenna equipment. However, the physical location of the ODU need not be outdoors. Furthermore, the ODU need not comprise traditional satellite television equipment, but may include other types of microwave frequency and/or wide bandwidth radio frequency (RF) signal receiving equipment.

The signals can be received on one or more polarities. In some systems, polarities are usually identified as vertical and horizontal. Each polarization is further divided into an upper and lower frequency band, allowing for four unique 1.2 GHz bands per satellite. Thus, an ODU having an 8 GHz bandwidth is designed to receive two satellite signals. In other systems, the polarizations are circular and thus are either right-hand circular or left-hand circular. The ODU converts the received satellite microwave signals to a lower frequency that can be demodulated by an associated IRD. In traditional systems the RF is converted down to intermediate frequency (IF) bands.

Each polarity contains many transponders, and each transponder contains many channels containing video, electronic program guides (EPGs), data, sound, and other content. For the purposes of this discussion, a channel is a radio frequency transponder signal. Before the advent of the single-cable technology, the entire frequency range of one polarity containing the transponder/video channel which the user wanted to see was switched onto and conveyed through a dedicated cable to the particular user. Each viewing location may want to see a video channel that was transmitted on a different polarity. Since only one polarity can be carried by a cable at one time, a unique cable run was required for each tuner.

In a single-cable system, the ODU down-converts the signals to a number of user-bands (UBs) of smaller bandwidth, for example 40 MHz. Each UB is centered on a fixed center frequency (CF) to which the tuner in a corresponding IRD is assigned (i.e., always tuned). Each UB is generally identified by a unique number. A channel stacking system in a single-cable interface (SCIF) device in the ODU selects a desired transponder containing the video channel that the user wants to view. The desired video channel is frequency shifted to a fixed frequency UB that is sent on the single-cable. The IRD then decodes this video channel for viewing. This fixed frequency UB procedure allows stacking of multiple UBs on a single-cable thereby allowing different viewing selections to be transmitted to multiple viewing locations over the single-cable.

A European industry standard for satellite signal distribution over a single coaxial cable in single dwelling has been promulgated by the European Committee for Electrotechnical Standardization (CENELEC), herein referred to as the CENELEC EN 50494 standard. The CENELEC EN 50494 standard (October, 2007) is generally accepted in at least a wide segment of the electronics industry. One of the processes set forth in the CENELEC EN 50494 standard provides a mechanism for auto-installation of IRDs on a single-cable. This process is intended to be used when one or more IRDs are to be installed or connected to the single-cable to receive satellite television signals. Since each IRD to be installed must coordinate with the ODU which UB the IRD will receive programming, there is a need for communication between the ODU and the IRD.

It should be noted that although the CENELEC EN 50494 standard refers to a single coaxial cable in a single dwelling, the same or similar principles apply to single-cable situations using media other than coaxial cables. In addition, these principles apply to installations in structures other than single dwellings (including installations in structures that are not used as dwellings).

In performing the auto-installation process according to the CENELEC EN 50494 standard, the IRD issues an "ODU_UBxSignal_ON" command in accordance with a format described in the CENELEC EN 50494 standard. In response, the ODU generates a plurality of RF "tones". One tone is generated at each UB slot center frequency. The IRD that is being installed then scans across the satellite signal band (950-2150 MHz) looking for the tones. According to the standard, the IRD adopts the first UB that it encounters.

In order to maintain a low cost and to maintain backward compatibility, that communication is essentially one-way between the IRD and the ODU. To accommodate this, the CENELEC EN 50494 standard prescribes a Digital Satellite Equipment Communications (DiSEqC™ 1.x) protocol (DiSEqC™ is a trademark of EUTELSAT). This protocol allows signaling between the IRD and ODU. The majority of systems use the DiSEqC 1.x protocol because it provides the basic functionality needed for communication between the ODU and the IRD at the lowest cost.

According to the DiSEqC™ 1.x protocol, the IRD can send tone signal commands to the ODU. However, the ODU can only communicate a "YES" or "NO" message in return. The ODU message is accomplished by sending a tone at the center frequency of the UB to represent a "YES". A tone 20 MHz above the center frequency represents a "NO." This makes the automatic negotiation and acquisition of a particular UB by an IRD difficult. That is, the information needed by the IRD to establish the identities of the UBs, coordinate the "understandings" of the ODU and IRD with respect to the operation of each other, and the like, are difficult to communicate using this protocol.

Another problem is that during the auto-installation of an IRD, after the "ODU_UBxSignal_ON" is issued, signals to any other active IRD on the cable may be disturbed. This may result in interference or even loss of video on a channel being watched by viewers using a previously installed IRD. Even worse, the UB that is acquired by the IRD being installed may be the same UB that was assigned to a previously installed IRD. This results in both IRDs using the same UB, which puts each IRD at the mercy of the other for channel selection and other functions. This is clearly undesirable.

As a consequence, the auto-installation process prescribed by the CENELEC EN 50494 standard has generally not been employed in instances in which multiple IRDs are to be installed. Rather, when multiple IRDs are to be installed, an installer must manually assign a unique UB to each IRD. This is time consuming, requires a certain degree of skill on the part of the installer, and may be impractical in multi-dwelling installations.

What is needed, therefore, is a method, apparatus, system, and computer program product for auto-installing IRDs on a single-cable in which multiple IRDs are to be installed. In addition, the method should ensure that signals to previously installed IRDs are not disturbed by the auto-installation process. Still further, in previously assigned UBs are not to be assigned to subsequently installed IRDs during an auto-installation process.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

To address the problems described above, an auto-installation process is described that may be based on the CENELEC EN 50494 standard command structure, with the addition of two new integrated receiver/decoder (IRD) commands. One preexisting command that can be sent by an IRD to an ODU in accordance with the CENELEC standard requests the ODU to send tones to the IRD. Each tone is generated at the center frequency of a user band (UB). One of the new commands requests the outdoor unit (ODU) assign a requesting IRD a UB number that corresponds to a UB slot (i.e., frequency) based on the IRD acquiring one of the tones generated by the ODU. The other new command allows the IRD to inform the ODU that the assigned UB number has been accepted. The ODU can then clear tones and mark the accepted UB as assigned.

Thus, disclosed is an embodiment of a method, apparatus, system, and computer program product for auto-installing an IRD. The auto-installation includes issuing an auto-installation command from the IRD to an ODU and receiving a plurality of tones from the ODU in response to the auto-installation command. Each tone represents a center frequency of a UB that has not been previously acquired by another IRD. The auto-installation also includes the IRD: (1) scanning/acquiring a UB center frequency, (2) requesting the ODU to verify a UB number that corresponds to the acquired UB center frequency, and (3) accepting the UB number that was verified by the ODU as corresponding to the acquired UB center frequency. Upon acceptance by the IRD, the ODU marks the assigned UB as assigned and sends an acknowledgement to the IRD confirming the assignment.

Also disclosed is an embodiment of a method, apparatus, system, and computer program product for auto-installing an IRD in which an ODU: (1) receives an auto-installation command from the IRD; (2) sends at least one tone on the cable in response to the auto-installation command, each tone that is sent represents a center frequency of a UB that is available to be assigned to the IRD; (3) receives a request from the IRD to verify a UB number corresponding to a UB center frequency that has been acquired by the IRD; (4) checks whether the UB number corresponds with the frequency indicated in the received request; (5) checks whether the UB corresponding to the UB number is currently unassigned (i.e., available); (6) sends a positive response (YES) if the UB number and corresponds with the frequency and the UB is unassigned; (7) receives from the IRD an acceptance of the assigned UB number; (8) marks the assigned UB as assigned in response to receipt of the acceptance; and (9) sends a response to the IRD confirming the assignment.

BRIEF DESCRIPTION OF THE DRAWINGS

The disclosed method and apparatus, in accordance with one or more various embodiments, is described with reference to the following figures. It should be noted that for clarity and ease of illustration these drawings are not necessarily made to scale. In the drawings, like reference numerals are used to denote like or similar parts.

FIGS. 6A and 6B show a flow diagram having a series of steps for performing a single-cable automatic installation without disturbance or interference to the active UB(s).

FIG. 8 is a flow diagram illustrating an example of a method for performing a deallocation of a UB by an IRD.

The figures are not intended to be exhaustive or to limit the claimed invention to the precise form disclosed. They should not be considered to limit the breadth, scope, or applicability of the claimed invention. It should be understood that the disclosed methods, apparatuses, and systems can be practiced with modification and alteration, and that the invention should be limited only by the claims and the equivalents thereof.

DETAILED DESCRIPTION

Figure 1:
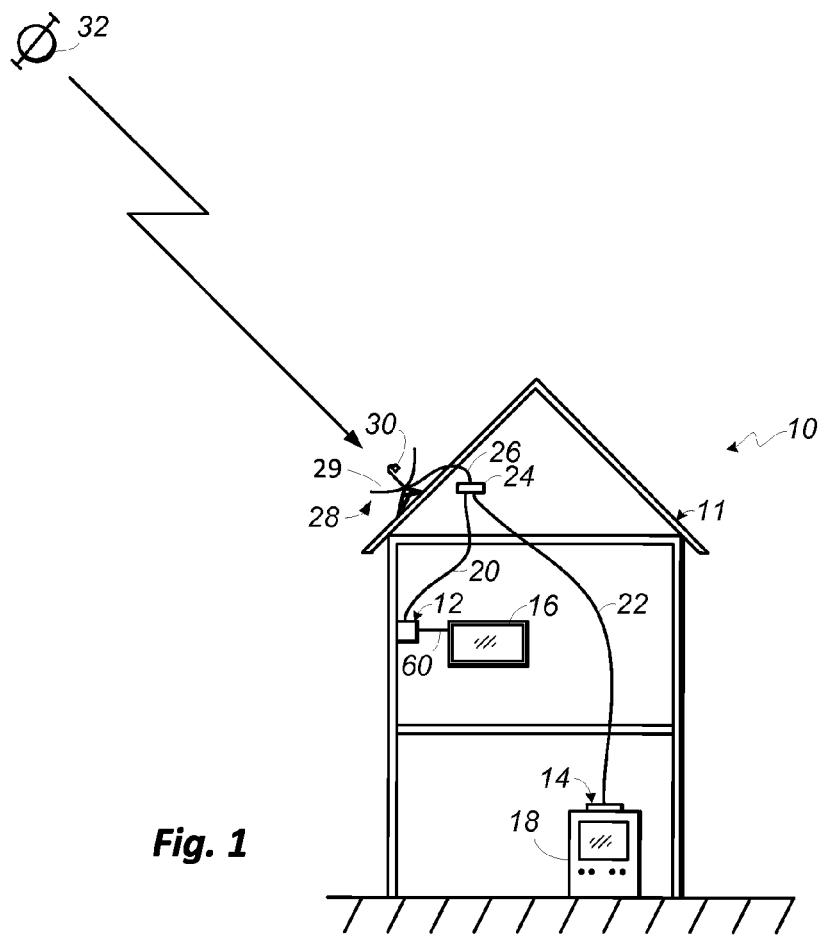
FIG. 1 illustrates an example of one environment in which the methods, apparatuses, systems, and computer program products described herein may be employed.

A typical home installation of a single-cable system is shown in FIG. 1 as an illustrative example of an environment 10 in which the methods described herein for auto-installing an integrated receiver/decoder (IRD) may be employed. The environment 10 illustrates a home installation having two IRDs, IRD #1 12 and IRD #2 14. IRD #1 12 is associated, for example, with a set-top box (STB). IRD #2 14 is associated, for example, with a personal video recorder (PVR). IRD #1 12 and IRD #2 14 are in separate locations of a dwelling or house 11. Alternatively, the IRDs 12, 14 may be associated with a myriad of other functional apparatuses or systems. For example, an IRD may be employed with the methods, apparatuses, systems, and computer program products described herein. The IRDs may be part of a PVR system having multiple inputs, a satellite radio system, a network hub to a wireless network, such as an IEEE 802.11b Direct Sequence network, or other system or device that converts radio-frequency signals to a useful user form. In the particular example illustrated, the IRD #1 12 provides television signals to a display 16, and the IRD #2 14 provides television signals to a television 18.

It should also be noted that although a single dwelling or house 11 is shown for illustration, the methods, apparatuses, and systems described herein may be employed in a myriad of other installation locations. One example may include an apartment complex. In that case, the IRDs may be employed in a number of apartments within one building or a number of buildings to which signals received on a single-cable may be distributed. Another example may include a business building in which IRDs may be employed in a number of offices to which signals received on a single-cable may be distributed. Other examples are manifold.

As shown in FIG. 1, satellite signals are received by an outdoor unit (ODU) 28 from a satellite 32. The ODU 28 is mounted, for example, on the roof or another appropriate location on the house 11. The ODU 28 includes a satellite dish (i.e., antenna) 29 and a low noise block (LNB) 30. The LNB 30 down-converts the microwave signals to appropriate user bands (UBs). A power divider 24 receives an input signal from the ODU 28 on a single-cable 26. The IRDs 12, 14 receive intermediate frequency (IF) signals from the power divider 24. The power divider 24 is a two-way splitter that receives RF signals having combined UBs and DC signals. These received signals are communicated from the ODU 28 through the power divider 24 to the IRDs 12, 14 on cables 20 and 22. In the other direction, the divider 24 allows command signals (for example DiSEqC™ signals of the type described by the CENELEC EN 50494 standard command structure) to be communicated to the ODU 28 from IRDs 12, 14.

The cables 20, 22, and 26 may be of any suitable cable construction, such as a coaxial cable, plastic optical fiber (POF), or the like. It should be noted that multiple cable satellite installations can carry unique information on each of the different cables. However, in a single-cable network, even though there are physically different cables (for example, cables 20, 22, and 26) each cable is electrically coupled to the other cables. Therefore, each cable in the signal-cable network always carries the same information.

With the exception of a software modification, the IRDs 12, 14 are of conventional construction. The software modification allows them to operate in a single-cable distribution installation of the type described herein. Furthermore, the IRDs should be able to tune to an assigned UB within the normal IF tuning range and modulate the LNB power voltage with a 22 kHz signal for issuing DiSEqC commands (according to the CENELEC EN 50494 standard, if followed).

Figure 2:
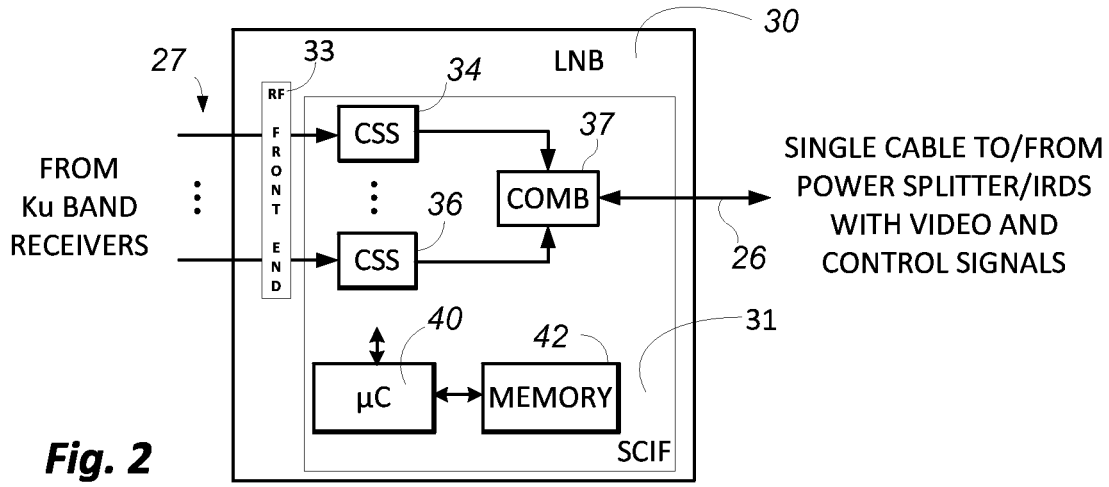
FIG. 2 shows an example of LNB circuitry of the ODU that may be used in the auto-installation of an IRD shown in the example environment of FIG. 1.

A block diagram of a portion of the LNB circuitry 30 of the ODU 28 is shown in FIG. 2. The LNB 30 shown receives, for example, four Ku/Ka sub-band channels/polarities 27. One or more of these sub-bands are down-converted to IF frequencies in an RF front end 33. The down-converted IF frequencies are applied to a Single Cable Interface (SCIF) 31. The SCIF 31 includes one or more Channel Stacking Switch (CSS) chips 34, 36. The SCIF 31 also includes a combining circuit 37 that combines or assembles the IF frequencies onto a single-cable 26. The output of the combining circuit 37 contains a number of composite UB signals. Other receiver and down-converter types may be equally advantageously employed. In one embodiment, the SCIF 31 includes a microcontroller 40 and associated memory 42 to control the various circuitry of the SCIF 31. Alternatively, the microcontroller and associated memory resides elsewhere in the LNB 30 or elsewhere in the ODU 28. In yet another embodiment, the microcontroller resides outside the ODU 28. The use of a microcontroller 40, memory 42, and CSS chips 34, 36 is currently widely known; however, other constructions may also be used, and it is envisioned that a number of other constructions will emerge in the future. Furthermore, it will be understood by those skilled in the art that the components and functions that are shown as being included within the LNB may be housed in several modules that are not collocated. For example, in one embodiment, the SCIF 31 may be located in a module placed inside the house 11.

Figure 3:
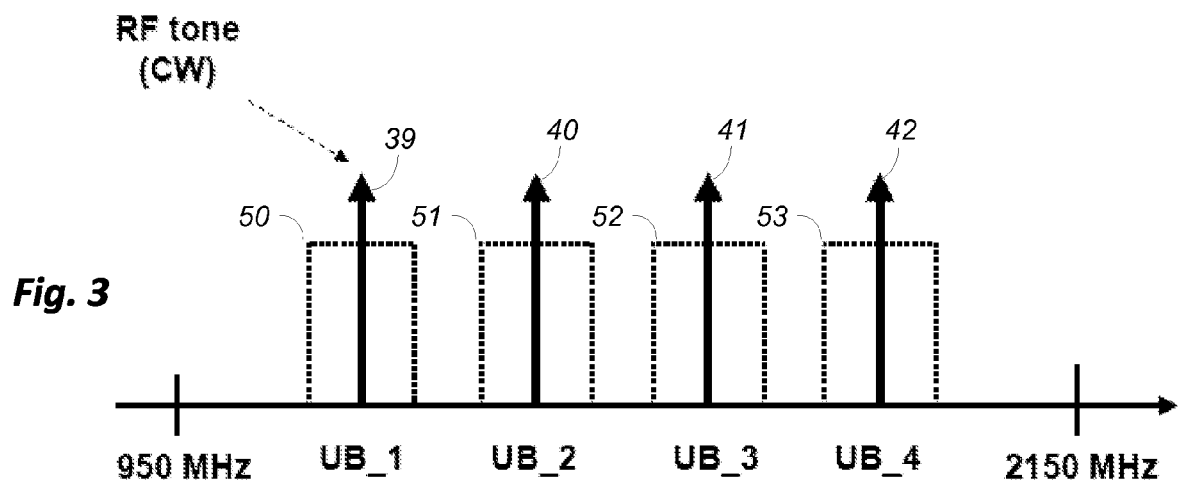
FIG. 3 illustrates an example of user bands with designated center frequency tones provided by an ODU.

The CSS chips 34, 36 frequency-convert sections of the received spectrum to center on the IF frequencies of the UBs. An example of the UBs is shown in FIG. 3. As shown in FIG. 3, four UBs 50-53 are generated by the CSS chips 34, 36. Each UB has a center frequency 39-42, respectively, in the radio frequencies between, for instance, 950 MHz and 2150 MHz. The UBs are numbered UB_1, UB_2, UB_3 and UB_4. Currently, UB frequencies in current single-cable systems are predetermined during manufacturing of the LNB. Analog surface acoustic wave (SAW) filters are used to separate each UB (future systems may employ other techniques and components).

Figure 4:
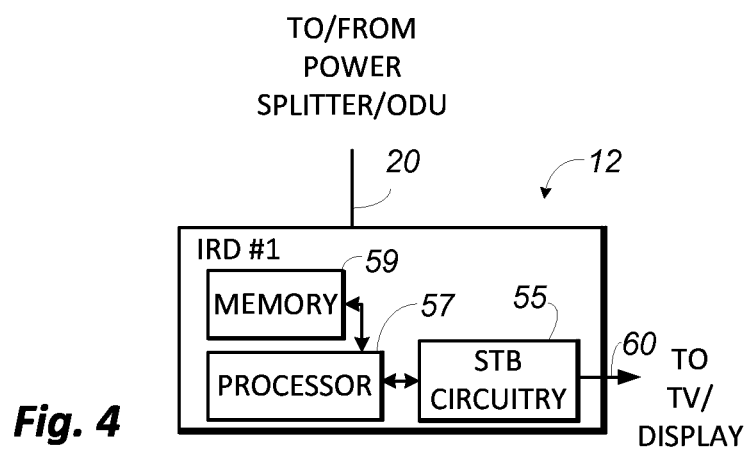
FIG. 4 shows an example of IRD circuitry of the STB that may be auto-installed on the single-cable installation shown in the example environment of FIG. 1.

A block diagram of a portion of the circuitry of the IRD #1 12 is shown in FIG. 4, to which reference is now additionally made. IRD #1 12 is shown for illustration as being associated with an STB. Accordingly, the IRD #1 12 has STB circuitry 55, a microprocessor 57, and a memory 59. The memory 59 may be a dedicated memory. Alternatively, memory is distributed among one or more separate semiconductor chips that provide, for example, other STB functionalities. In any event, the memory 59 contains program instructions to cause the microprocessor 57 to perform certain steps (including those described below) to operate the associated hardware and circuitry. The IRD 12 receives signals on the cable 20 from the power splitter 24, and in turn from the ODU 28. The received signals include multiplexed UB signals from which an assigned UB signal will be derived, as described below. The output from the IRD 12 in this particular example is connected to a television or display 16 (see FIG. 1) on a line 60.

Figure 5:
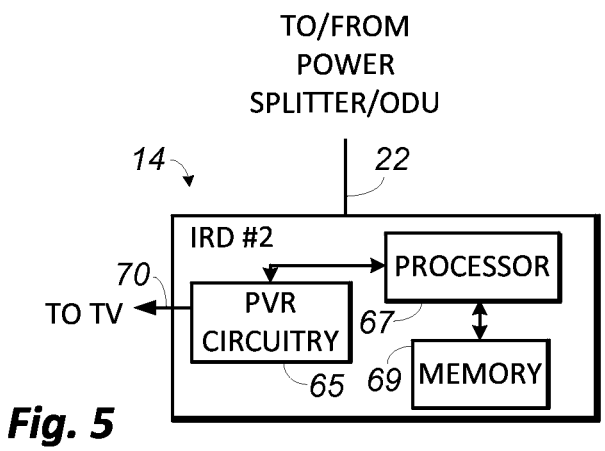
FIG. 5 shows an example of IRD circuitry of the PVR that may be auto-installed on the single-cable installation shown in the example environment of FIG. 1.

Similarly, a block diagram of a portion of the circuitry of the IRD #2 14 is shown in FIG. 5, to which reference is now additionally made. IRD #2 14, also shown for illustration as being associated with a PVR having PVR circuitry 65, a microprocessor 67, and a memory 69. The memory 69 may be a dedicated memory. Alternative, memory is distributed among one or more separate semiconductor chips that provide, for example, other PVR functionalities. In any event, the memory 69 contains program instructions to cause the microprocessor 67 to perform certain steps (including those described below) to operate the associated hardware and circuitry. The IRD 14 receives signals on the cable 22 from the power splitter 24, and in turn, from the ODU 28. The received signals include multiplexed UB signals from which an assigned UB signal will be derived, as below described. The output from the IRD 14 in this example is connected to a television 18 (see FIG. 1) on a line 70 (not shown in FIG. 1).

Figure 6A:
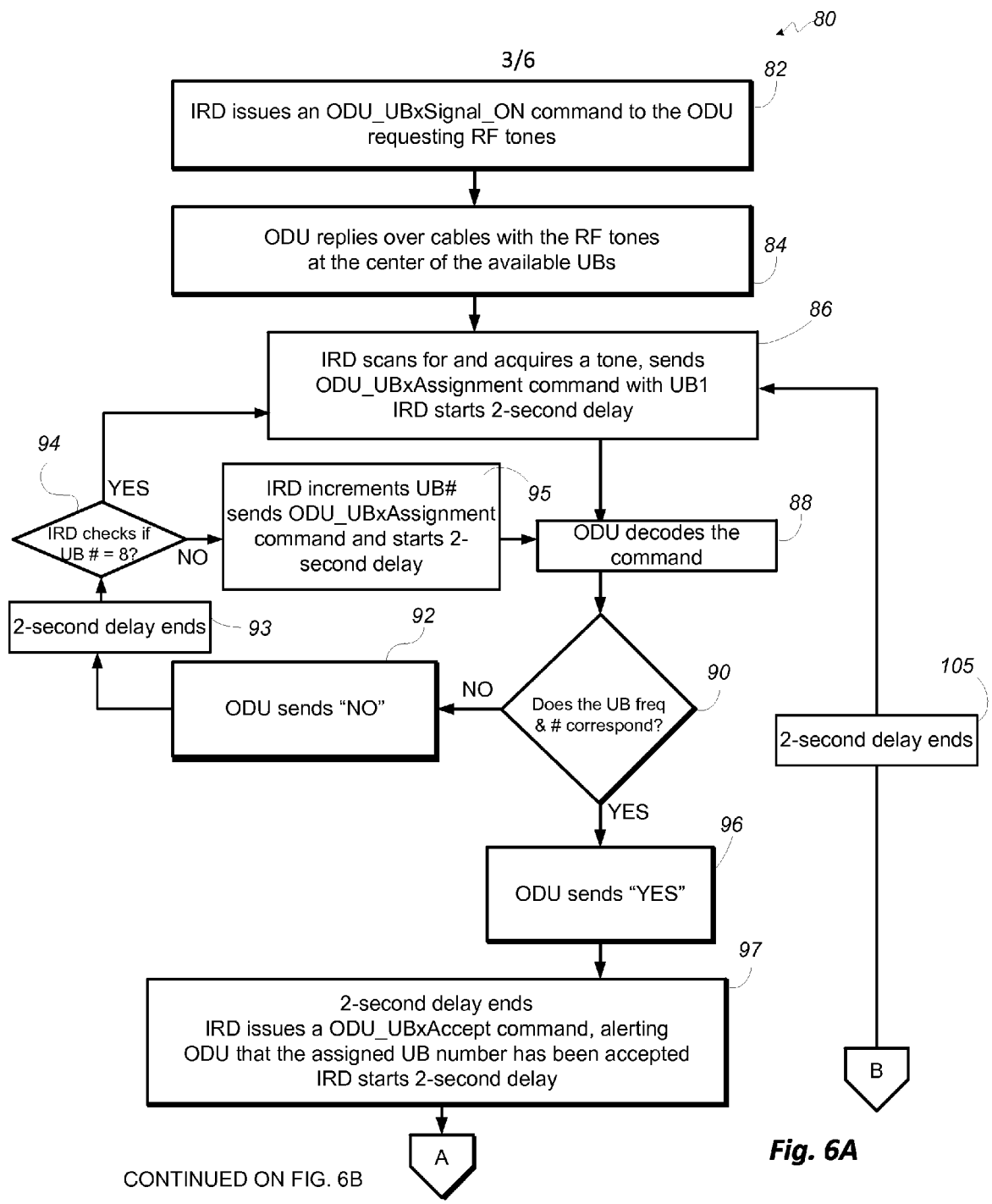

FIGS. 6A and 6B is a flow diagram 80 showing a series of steps for performing a single-cable automatic installation. The installation allows a UB to be auto-assigned without disturbance or interference to active UBs. For illustration, the installation is described in accordance with the CENELEC EN 50494 standard; however, it should be understood that the method can be equally advantageously employed in conjunction with other standards and techniques, as well. In the following description it should be understood that the various commands, responses, replies, determinations, and other actions may be performed by the respective microprocessors and memories of the respective IRDs 12, 14. These can be done in conjunction with the microcontroller 40 and memory 42 of the LNB 30 (in one embodiment, in the SCIF 31 within the LNB 30). Program instructions in the memories are executed by their respective microprocessor or microcontroller to perform the stated actions. Nevertheless, it should be also understood that other methods may be employed to implement the actions described.

The IRDs 12, 14 and ODU 28 include microprocessors and microcontrollers that function as central processing units (CPUs) to control operation of the system. The terms microprocessor and microcontroller are intended to encompass any processing device capable of operating the system or parts thereof. This includes microprocessors, microcontrollers embedded controllers, application-specific integrated circuits (ASICs), digital signal processors (DSPs), state machines, dedicated discrete hardware, or the like. In one embodiment, the central processing functions are performed by devices that are not programmed, such as discrete components or one or more state machines. Accordingly, it is not intended that the microprocessors or microcontrollers be limited to any particular type of hardware component implementation. These devices may also be implemented as combinations of computing devices, for example, a combination of a DSP and a microprocessor, a plurality of microprocessors, one or more microprocessors in conjunction with a DSP core, or any other such configuration. Moreover, the processing and controlling devices need not be physically collocated with the part of the system it serves. For example, a central processing unit or programmed computer may be associated with and appropriately connected to each of the various components of the system to perform the various actions described herein.

The CELENEC standard provides a mechanism by which an IRD can verify the configuration of the system (i.e., ensure that the IRD and the SCIF are using the same information). The information that can be verified includes: (1) the number of satellite positions; (2) the number of input banks; (3) whether standard or wideband RF; and (4) the number of UB slots. This mechanism is provided in the CENELEC EN 50494 standard at sections 6.3.3 and 7.3. As defined by CENELEC, a bank is a group of contiguous channels belonging to a polarization and/or a band.

In accordance with the CENELEC standard, a command having the following structure is sent by the IRD to verify the configuration of the system: E0 00 5B Data1 Data2. In accordance with this structure, "E0" is a framing word. The framing word is followed by an address. Three SCIF addresses are recognized in accordance with the CENELEC standard: 00, 10, 11. A command word follows the address. There are two commands that are defined.

The first command is 5A hex (i.e., 0101 1010 binary). The command 5A is used for "normal operations" as defined by the CENELEC standard. Such normal operations include "ODU_Channel_change" and "ODU_PowerOFF". Further information about these commands can be attained from review of the CENELEC standard.

The second command is 5B hex (i.e., 0101 1011 binary). The command 5B is used for "special modes" as defined by the CENELEC standard. In 5B commands, Data1 is an 8 bit word in which bits 7 through 5 indicate a UB number. Bits 4 through 0 indicate a Sub-function. A sub-function value of 01 hex (i.e., 0 0001 binary) is used to indicate that the command is attempting to check the configuration number (Config_Nb) associated with the UB indicated in bits 7 through 5. Table 4 of the CENELEC standard provides a cross reference table between values for Config_Nb and the number of satellites, number of input banks, whether standard or wideband RF and the number of UB slots in the system. For example, a value of 10 hex (i.e., 0001 0000 binary) indicates that there is one satellite position, 4 input banks, standard RF and 2 UB slots. Data2 is an 8 bit word that contains the value of the configuration number (Config_Nb) that is being checked. In every case, the SCIF 31 within the ODU 30 will respond either affirmatively by transmitting a tone in the center of the UB or negatively by transmitting a tone that is offset from the center frequency of the UB. If the information transmitted in the command matches information stored within the SCIF 31, then the SCIF 31 will respond affirmatively. Otherwise, the SCIF 31 will respond negatively.

To verify the frequency of the local oscillator (i.e., ODU_LoFreq), CENELEC EN 50494 standard, sections 6.3.4 & 7.4 defines a command E0 00 5B Data1 Data2. In this command, E0 is a framing word, 00 is the address, 5B is the command and Data1 is an 8 bit word in which bits 5-7 indicate the UB number, and bits 4 through 0 indicate the Sub-function. Sub-function=02 hex (i.e., 0 0010 binary) indicates ODU_LoFreq. Data2 is a value that indicates the particular frequency of the local oscillator to be verified in the command. Table 5 of the CENELEC standard provides an LoFreq table that cross references the value of Data2 to a particular local oscillator frequency. For example, a value of 02 hex (i.e., 0000 0010 binary) in Data2 indicates a local oscillator frequency of 9,750 MHz. If the information transmitted in the command matches information stored within the SCIF 31, then the SCIF 31 will respond affirmatively. Otherwise, the SCIF 31 will respond negatively.

The process defined in the CENELEC EN 50494 standard is modified to follow the steps next outlined below. In particular, two new commands are defined herein to alleviate some of the problems that exist in the current CENELEC standard.

Referring now to the flow chart of FIG. 6A, initially, the IRD being installed, for example, IRD #1 12, issues an ODU_UBxSignal_ON command over cables 20 and 26 to the ODU 28 (box 82). In particular, the IRD will send "E0 00 5B 00 00" as defined by the CELENEC standard. In one embodiment, the first command of the auto-installation process is manually activated by the installer. In one such embodiment, the installer initiates the transmission of the command by selecting to start auto-installation. In one embodiment of the disclosed method and apparatus, this option is made available in an IRD installation menu. In one such embodiment, this selection appears in grey or is not available when the IRD already has acquired a UB.

Alternatively, the installer can enter a code into the IRD through a user interface, such as a keypad or interface port. In one embodiment, the interface port is configured to allow a technician to plug an external device into the IRD. Such a device can then control functions of the IRD or provide service or recover diagnostic information from the IRD. Additionally, at power-up or when waking up from standby, the IRD may check to see if it has an assigned UB. If not, the IRD will send the "ODU_UBxSignal_ON" command to automatically initiate the auto-install process. In response to receipt of the ODU_UBxSignal, the SCIF 31 replies over cable 26 and cables 20 and 22 by sending the RF tones (herein referred to merely as "tones") at the UB center frequencies that are currently available (i.e., not assigned to previously installed IRDs) (box 84). As noted above, in an alternative embodiment, the functions noted herein as being performed by the SCIF 31 could be performed by any component of the ODU 28. Accordingly, the flowchart shown in FIGS. 6A and 6B attribute the actions of the SCIF 31 to the ODU 28.

Referring again to FIGS. 1, 2 and 3, when, for example, a first IRD, such as IRD #2 14, shown in FIG. 1, is auto-installed, the IRD will send the ODU_UBxSignal_ON. The SCIF 31 will respond with four tones corresponding to the center frequencies 39 through 42 of UB_1 50, UB_2 51, UB_3 52 and UB_4 53, respectively (see FIG. 3). The IRD #2 14 scans for and acquires, for example, UB_1 50 by detecting the tone at the center frequency 39. Subsequently, when another IRD, such as IRD #1 12 initiates its auto-install process, in response to its request for tones (i.e., transmission of the ODU_UBxSignal_ON), the SCIF 31 responds only with tones corresponding to the available (i.e., unassigned) UBs. In this example, the SCIF 31 sends tones at the center frequencies 40 through 42. This enables the IRD #1 12 to acquire, for example, UB_2 51 detected at the center frequency 40. Because the tone at the previously assigned center frequency 39 is absent from the tones on the cables 26, 20, and 22, the operation of the previously installed IRD #2 14 is unaffected by the auto-installation of IRD #1 12.

The next command sent by the IRD #1 12 is a new command not previously defined by the CENELEC standard. That command is referred to herein as "ODU_UBxAssignment". After sending the ODU_UBxAssignment command, the IRD will start a timer, such as a 2 second timer in one embodiment (box 86). The ODU_UBxAssignment command has the command structure E0 00 5B Data1 Data2. Data1 is an 8 bit word, the first three bits (i.e., bits 7 through 5) indicate the UB number and the next 5 bits (bits 4 through 0) indicate the Sub-function. The ODU_UBxAssignment command carries value of 03 hex (i.e., 0 0011 binary) in the sub-function bits. Data2 field contains the UB frequency of the acquired tone divided by 10 and rounded off. The rounding is done as defined by the CENELEC EN 50494 standard. In accordance with one embodiment of the disclosed method and apparatus, this command is automatically issued by the IRD #1 12 and informs the SCIF 31 which UB tone was acquired by the IRD #1 12. The UB number (i.e., bits 7 through 5 of the Data1 field) is initially set to UB_1, no matter which frequency was acquired. This is because the IRD has no way of knowing what UB number is associated with the frequency acquired.

In response to receipt of the ODU_UBxAssignment command, the SCIF 31 confirms that the UB number corresponds with the frequency indicated in the ODU_UBxAssignment command. The SCIF 31 decodes the command (box 88), and responds with either a "YES" or "NO" (diamond 90).

A "YES" response indicates that the UB center frequency indicated in the ODU_UBxAssignment command corresponds with the UB number sent in the ODU_UBxAssignment command. In one embodiment, a "YES" response further indicates that the UB number just acquired by the IRD is not in the ODU allocation list, and is therefore available (box 92).

A "NO," response (diamond 90) indicates that the UB frequency just acquired by the IRD (as indicated in ODU_UBxAssignment command) either does not correspond to the UB number indicated in the ODU_UBxAssignment command or that the UB number is not available. If a "NO" response is sent by the SCIF 31 (box 92), the IRD waits for the two second delay that was started in box 86 to expire (box 93). Once expired, the IRD checks to see whether the value in the UB field of the last ODU_UBxAssignment command was at its maximum value. In the example shown in FIG. 6A, that value is UB_8 (box 94). If not, then the IRD increments the UB number, sends another ODU_UBxAssignment command with the updated UB number and starts another two second delay (box 95). The process (boxes 88 through 95) repeats until either a "YES" response is received from the SCIF 31 (box 90) or the UB number reaches the greatest value permissible (box 95). Since the IRD has no way of knowing the proper UB number, the IRD will start with UB_1 (box 86) and cycle through all of the possible UB numbers (box 95) until a positive response is received from the SCIF 31 (box 96).

In accordance with one embodiment of the disclosed method and apparatus, the IRD will wait for the 2 second timer set in box 86 to expire and then scan for a "YES" (box 97) or "NO" (box 93) response from the SCIF 31. In accordance with one embodiment of the disclosed method and apparatus, if the IRD does not receive a "YES" response after going through all of the available UB numbers with that UB frequency (i.e., the IRD checks to find that the UB# is at the maximum value) (box 94), the IRD will scan to the next tone (box 86). The IRD will send another ODU_UBxAssignment command indicating in the DATA2 field the UB frequency of that next tone. The IRD will then, starting with the first UB number, (UB_1) and repeat the ODU_UBxAssignment command incrementing the UB number each time until a "YES" is received (boxes 88 through 95). This is repeated for each UB number and each UB frequency until either a "YES" response is received (box 97) or all of the combinations of UB number and frequency are exhausted. In accordance with one embodiment, once exhausted, the installer can repeat the auto-installation again by selecting to send the ODU_UBxSignal_ON command.

After the IRD has successfully acquired a tone and the SCIF 31 has indicated that the UB number and frequency in the assignment command agree and are available by sending the YES (box 96), the IRD will wait for the 2 second delay set in box 86 to expire before detecting the YES. The IRD then issues a ODU_UBxAccept command (box 97). The ODU_UBxAccept command has a command structure E0 00 5B Data1 00, where Data1 is an 8 bit word, bits 7 through 5 indicating the UB number, and bits 4 through 0 indicating the Sub-function. The Sub-function for this command is 04 hex (i.e., 0 0100 binary). This command alerts the SCIF 31 that the assigned UB number has been accepted. After sending the UB accept command, the IRD waits for a preset time, for example, 2 seconds, and then scans for a "YES" or "NO" answer. The preset time needs to be long enough to enable the SCIF 31 to verify that no other IRD has the assigned UB.

The SCIF 31 decodes the command (box 98), and determines if the UB number is in the allocation list (diamond 99). If the UB number is not in the allocation list, the SCIF 31 responds with a "YES" (box 100). After waiting for the delay to expire the IRD checks for the "YES" response from the SCIF 31. The IRD then saves the UB number in memory (box 108). However, if the UB is already assigned, the SCIF 31 will reply with a "NO" (box 104). After waiting for the expiration of the delay (box 105), the IRD will detect the NO response. The process then goes back to box 86 to search for another UB.

After a "YES" is received by the IRD (box 108), the IRD sends out an "ODU_PowerOFF" command (box 110) and the SCIF 31 clears this tone (box 112). (See, for example, CENELEC EN 50494 standard, section 6.2.2, page 14, for a definition of ODU_PowerOFF).

If, during the auto-installation process, the IRD sends the wrong UB frequency to UB number relationship, the SCIF 31 cannot match the frequency to one of its UBs, and therefore will fail to answer YES to any of the signaling commands. This implies that the IRD most likely had captured a bad or non-UB tone and it should move on to acquire the next tone and request a UB assignment again. The IRD will continue to acquire the next tone until it receives a "YES" or it has acquired the last tone. If the IRD, in the example above, continues to detect a wrong frequency, it can repeat the auto-installation process by sending send out the "ODU_UBxSingal_ON" command again.

Figure 7A:
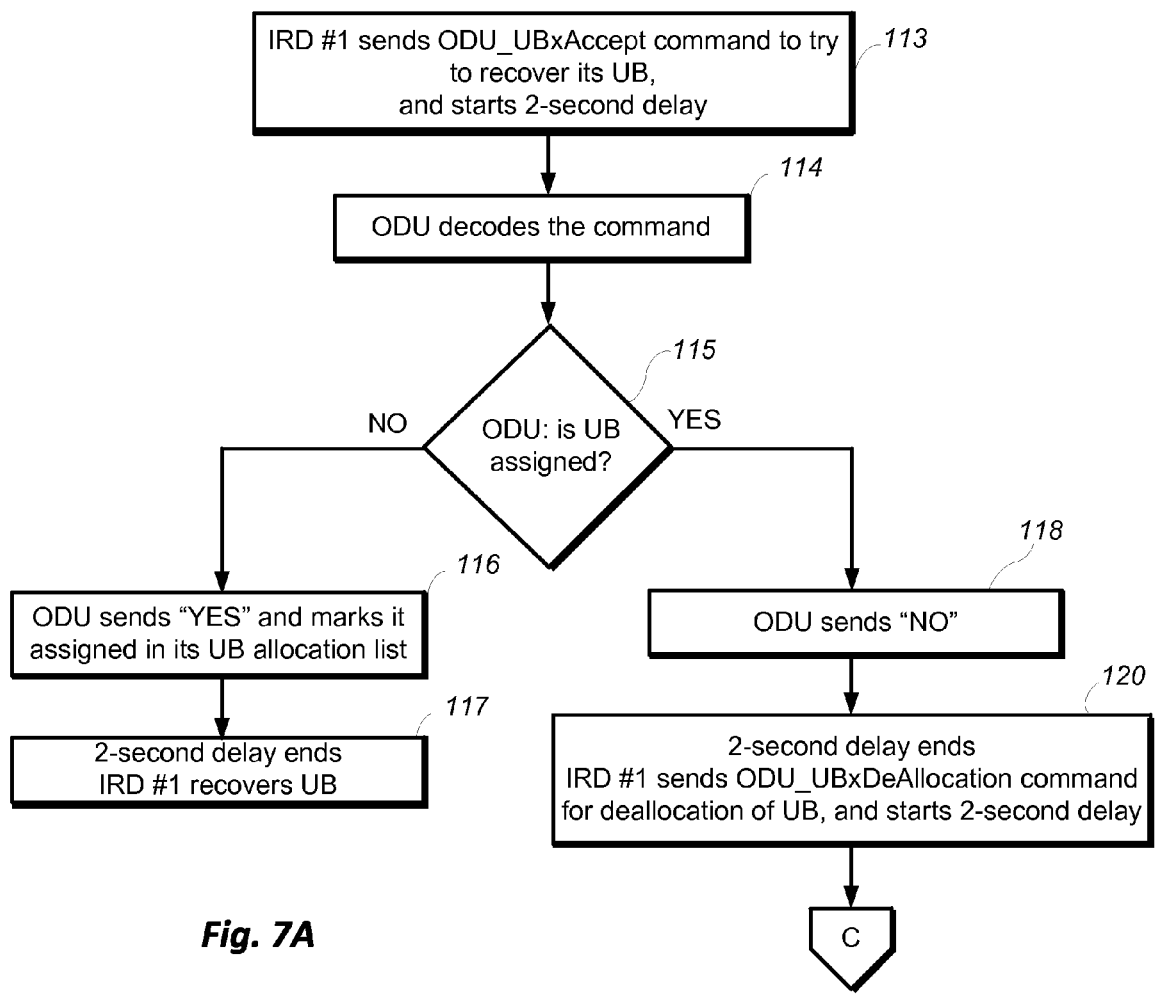
FIGS. 7A and 7B show a flow diagram illustrating an example of a power-up or boot-up process for an IRD that had been assigned a UB prior to the most recent power down of the IRD.
Figure 7B:
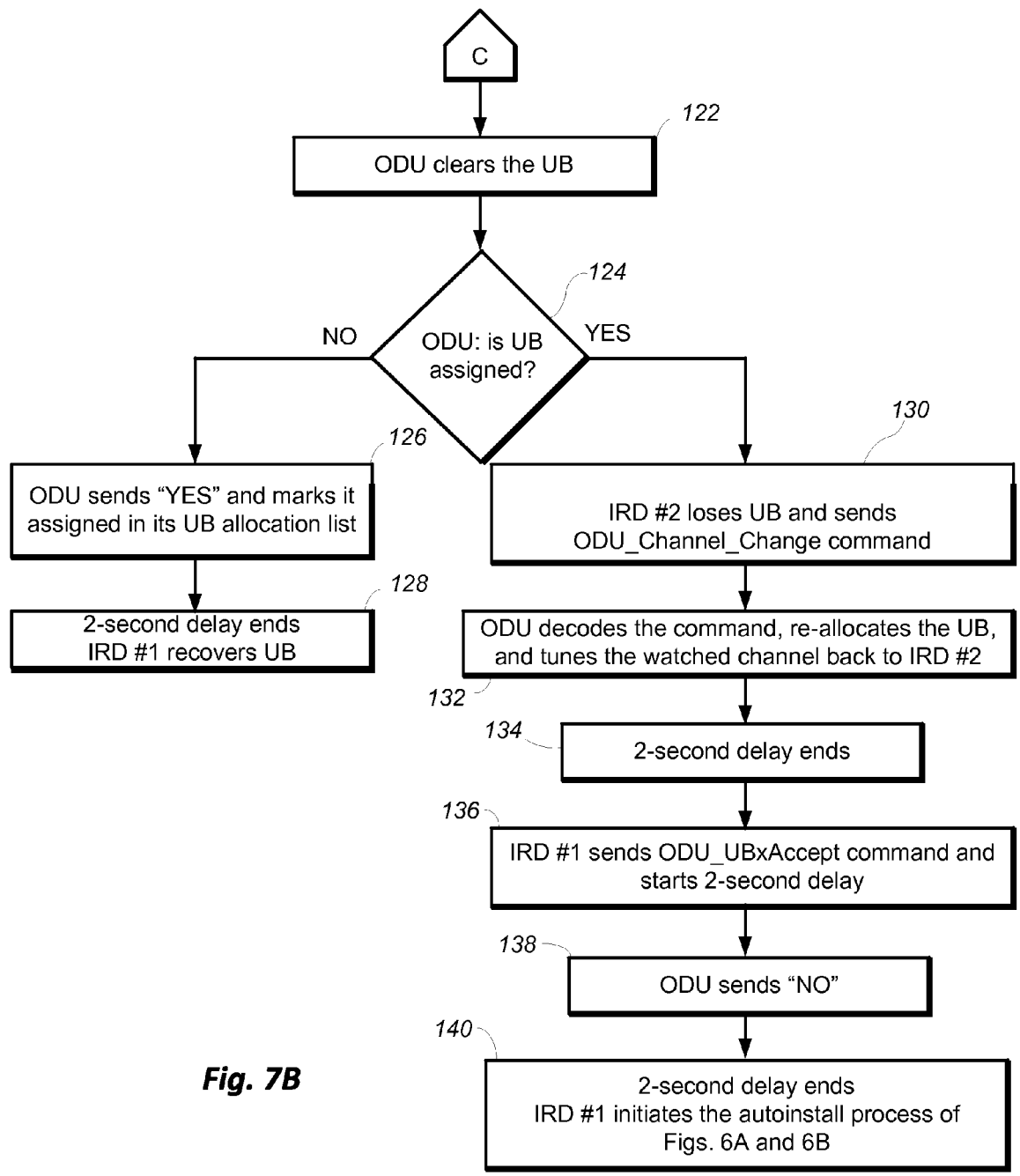

FIGS. 7A and 7B illustrate a UB recovery and deallocate process. As noted with regard to FIGS. 6A and 6B, functions performed by the SCIF 31 are attributed to the ODU 28, since it is within the scope of the disclosed embodiments for the functions to be performed by any component in the ODU 28. However, for the sake of clarity, these functions are indicated in the following text as being performed by the SCIF 31. In accordance with one embodiment of the disclosed method and apparatus, after an IRD that has already been assigned a UB slot is powered down, and at its next power-on, the IRD sends out a "ODU_UBxAccept" command to try to recover its UB slot. After sending the command, IRD #1 waits two seconds (box 113). The "ODU_UBxAccept" command is sent during the IRD boot up procedure. SCIF 31 decodes the command (box 114). If the requested UB slot is available (i.e., has not been assigned to another IRD) (diamond 115), the SCIF 31 replies with a "YES". The SCIF 31 marks the UB slot as assigned in its UB allocation list (box 116). Accordingly, after waiting for the expiration of the timer set in box 113, the IRD is reassigned its UB slot. (box 117).

On the other hand, if the SCIF 31 determines that the UB slot is currently assigned (diamond 115), the SCIF 31 sends a "NO" (box 118). After the expiration of the two-second delay started in box 113, IRD #1 sends a deallocation command [ODU_UBxDeAllocation] and starts a timer, such as a 2 second timer (box 120) in accordance with one embodiment of the disclosed method and apparatus. The deallocation command requests the SCIF 31 to deallocate and disable the RF signal for a specific UB slot. Disabling the RF signal for that UB slot will check if that slot has been assigned to another IRD. The SCIF 31 then deallocates or clears the requested UB slot (box 122).

In accordance with one embodiment of the disclosed method and apparatus, the ODU_UBxDeAllocation is a new command having a command structure—E0 00 5B Data1 00. Data1 is an 8 bit word in which bits 7 through 5 indicate a UB number and bits 4 through 0 indicate a Sub-function. In accordance with one embodiment of the disclosed method and apparatus, the sub-function for this command is 05 hex (0 0101 binary). The command issued by the IRD requests the SCIF 31 to remove or deallocate the UB indicated in Data1 bits 7 through 5.

Next, one of the following scenarios will take place:

First if the deallocated UB slot was not assigned to another IRD (diamond 124), the SCIF 31 replies with a "YES" (box 126). When IRD #1 sees a "YES" answer after the expiration of the 2 second delay set in box 120, IRD #1 recovers the previous UB slot (box 128).

Alternatively, if the deallocated UB slot was already assigned to another IRD (box 124), for example a second IRD #2 to which the UB slot was assigned, the second IRD #2 will lose its signal during the two-second delay period. IRD #2 will then send an ODU_Channel_Change command immediately (box 130). It should be noted that the ODU_Channel_Change command has priority over other commands. This ensures that IRD #2 will continue to receive video signals without interference or disruption. The SCIF 31 then reassigns the corresponding UB slot back to IRD #2 (box 132). Then, after the timer set in box 120 expires (box 134), IRD #1 sends an ODU_UBxAccept command indicating the UB slot to which it is attempting to recover. The IRD #1 also starts another timer (such as a two-second timer in one embodiment) (box 136). The SCIF 31 replies with a "NO" (box 138), since that UB slot was reassigned by the SCIF 31 to IRD #2 in box 132. When IRD #1 receives the "NO" answer, IRD #1 recognizes that the UB has been reassigned and so starts a new auto-install procedure as described above with reference to FIGS. 6A and 6B (box 140).

As noted above with respect to the process of FIGS. 7A and 7B, it may be desirable to deallocate an IRD. In accordance with one embodiment, this may be done with a manual issuance of the ODU_UBxDeAllocation command. ODU_UBxDeAllocation is a new command having a command structure—E0 00 5B Data1 00, as noted above. FIG. 8 illustrates the process. In one embodiment, the ODU_UBxDeAllocation command can be issued only by an IRD with an assigned UB. This command may also be automatically initiated, for example, in instances in which an IRD attempts to recover its previous UB after a power cycle, as discussed above (box 150). In response, to the ODU_UBxDeAllocation: command, the SCIF 31 clears the corresponding UB from its allocation list (box 152).

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of auto-installing an integrated receiver/decoder (IRD) comprising:
    a) issuing first command from the IRD to an outdoor unit (ODU);
    b) receiving at least one tone from the ODU in response to the first command, each tone representing a center frequency of a user band (UB) that has not been assigned to another IRD;
    c) issuing a second command to the ODU, the second command indicating the frequency of at least one of the received tones and further indicating a UB number;
    d) receiving an affirmative response from the ODU that the UB number indicated in the second command corresponds to the frequency indicated in the second command and that the frequency is available; and
    e) sending a third command indicating an acceptance of the UB number and thus signaling the ODU that it may mark the available UB as assigned.

2. The method of claim 1, further comprising:
    a) receiving a negative response from the ODU indicating that the frequency indicated in the second command does not correspond with the UB number indicated in the second command;
    b) incrementing the UB number of the second command and repeating the second command with the incremented UB number;
    c) repeating 2(b) until a positive response is received; and
    d) once a positive response to the second command is received, sending the third command of 1(e).

3. The method of claim 2, wherein if a positive response to the second command is not received after incrementing the UB number to its maximum value, then repeating the method from 1(b).

4. The method of claim 3, wherein if a positive response to the second command is not received after scanning all of the at least one tones received, repeating the method from 6(a).

5. The method of claim 4, wherein each of the responses sent by the ODU are either a tone at the center frequency of a UB indicating an affirmative response, or a tone at a frequency offset from the center of a UB indicating a negative response.

6. The method of claim 1, further comprising:
    a) in response to the third command, receiving an affirmative response from the ODU that the UB number has been assigned to the IRD by the ODU.

7. A method of auto-installing an integrated receiver/decoder (IRD) comprising:
    a) receiving an auto-installation command from an IRD by an outdoor unit (ODU);
    b) sending at least one tone on the cable from the ODU in response to the auto-installation command, each said at least one tone representing a center frequency of a user band (UB) that is available to be assigned to the IRD;
    c) receiving a request from the IRD to confirm a UB number to be assigned to the IRD, the request including;
    d) sending confirmation of a UB number corresponding to the UB center frequency that has been acquired by the IRD,
    e) receiving an acceptance of the assigned UB number from the IRD; and f) marking the assigned UB as assigned within an allocation list.

8. The method of claim 7, wherein said marking the assigned UB as assigned comprises assigning a "TRUE" value to the UB center frequency that has been acquired by the IRD.

9. The method of claim 7, further comprising receiving a command that has been selectively sent from the IRD to deallocate the assigned UB associated with the UB center frequency that has been acquired by the IRD.

10. A method for auto-installing an integrated receiver/decoder (IRD), comprising:
  a) issuing an auto-installation command from the IRD to an outdoor unit (ODU);
  b) providing a plurality of tones on the cable to the IRD from the ODU in response to the auto-installation command, each tone representing a center frequency of an available user band (UB);
  c) acquiring a UB center frequency by the IRD;
  d) requesting the ODU to confirm to the IRD a UB number corresponding to the acquired UB center frequency;
  e) confirming the UB number from the ODU to the IRD in response to the request;
  f) sending an acceptance of the UB number from the IRD to the ODU, and
  g) marking the assigned UB as assigned by the ODU.

11. The method of claim 10 further comprising issuing a request from the IRD to the ODU to clear the tones after sending the acceptance of the assigned UB number and clearing the tones by the ODU.

12. An integrated receiver/decoder (IRD) comprising:
  a) means for initiating an auto-installation command from an IRD to an outdoor unit (ODU);
  b) means for receiving a plurality of tones from the ODU in response to the auto-installation command, each tone representing a center frequency of available user bands (UBs);
  c) means for acquiring a UB center frequency;
  d) means for requesting the ODU to confirm a UB number corresponding to the acquired UB center frequency;
  e) means for receiving confirmation of a UB number from the ODU corresponding to the acquired UB center frequency,
  f) means for sending an acceptance of the assigned UB number from the IRD to the ODU, whereby the ODU is enabled to mark the assigned UB as assigned.

13. The IRD of claim 12 wherein the means for initiating an auto-installation command can be manually actuated.

14. The IRD of claim 12 further comprising means for sending a request from the IRD to the ODU to clear the tones after the acceptance of the assigned UB number has been sent.

15. A non-transitory computer program product comprising program instructions which, when executed by a processor, cause the processor to auto-install an integrated receiver/decoder (IRD), the program instructions comprising instructions for:
  a) sending an auto-installation command from the IRD to an outdoor unit (ODU);
  b) receiving a plurality of tones from the ODU in response to the auto-installation command, each tone representing a center frequency of available user bands (UBs);
  c) acquiring a UB center frequency;
  d) requesting the ODU to confirm a UB number corresponding to the acquired UB center frequency;
  e) receiving a UB number confirmation from the ODU corresponding to the acquired UB center frequency,
  f) sending an acceptance of the assigned UB number from the IRD to signal the ODU that it may mark the assigned UB as assigned.

16. The non-transitory computer program product of claim 15 further comprising program instructions for sending a request from the IRD to the ODU to clear the tones after sending the acceptance of the assigned UB number.

17. The non-transitory computer program product of claim 16 further comprising program instructions for sending in response to a manual selection a command from the IRD to the ODU to deallocate the assigned UB associated with the UB frequency slot acquired by the IRD.

18. The non-transitory computer program product of claim 15 wherein the program instructions are contained in at least one semiconductor chip.

19. A non-transitory computer program product comprising program instructions which, when executed by a processor, cause the processor to auto-install an integrated receiver/decoder (IRD), the program instructions comprising instructions for:
  a) receiving an auto-installation command from the IRD by an outdoor unit (ODU);
  b) sending a plurality of tones from the ODU in response to the auto-installation command, each tone representing a center frequency of available user bands (UBs);
  c) receiving a request at the ODU to confirm a UB number corresponding to a UB center frequency acquired by the IRD;
  d) sending a UB number confirmation from the ODU corresponding to the acquired UB center frequency, and
  e) receiving an acceptance of the assigned UB number from the IRD to signal the ODU that it may mark the assigned UB as assigned.

20. The non-transitory computer program product of claim 19 further comprising program instructions for receiving a request from the IRD to the ODU to clear the tones after sending the acceptance of the assigned UB number.

21. The non-transitory computer program product of claim 19 further comprising program instructions for receiving, in response to a manual selection, a command from the IRD to the ODU to deallocate the assigned UB associated with the UB acquired by the IRD.

22. The non-transitory computer program product of claim 19 wherein the program instructions are contained in at least one semiconductor chip.

* * * * *